(12) United States Patent
Gilbert

(10) Patent No.: US 8,504,705 B2
(45) Date of Patent: *Aug. 6, 2013

(54) SYSTEMS AND METHODS FOR LIMITING WEB SITE ACCESS

(75) Inventor: Lanny Gilbert, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1356 days.

This patent is subject to a terminal disclaimer.

(21) Appl. No.: 11/208,904

(22) Filed: Aug. 22, 2005

(65) Prior Publication Data

US 2006/0031503 A1 Feb. 9, 2006

Related U.S. Application Data

(63) Continuation of application No. 09/873,712, filed on Jun. 4, 2001, now Pat. No. 6,968,385, which is a continuation of application No. 09/747,005, filed on Dec. 22, 2000, now abandoned.

(51) Int. Cl.
*G06F 15/16* (2006.01)
*G06F 11/30* (2006.01)

(52) U.S. Cl.
USPC .......................................... 709/229; 726/20

(58) Field of Classification Search
USPC ................................. 709/229, 225, 227, 219
See application file for complete search history.

(56) References Cited

U.S. PATENT DOCUMENTS

| | | | |
|---|---|---|---|
| 5,678,041 A | 10/1997 | Baker et al. | |
| 5,812,764 A | 9/1998 | Heinz, Sr. | |
| 5,991,807 A | 11/1999 | Schmidt et al. | |
| 6,055,637 A | 4/2000 | Hudson et al. | |
| 6,112,240 A | 8/2000 | Pogue et al. | |
| 6,154,741 A | 11/2000 | Feldman | |
| 6,233,618 B1 | 5/2001 | Shannon | |
| 6,256,739 B1 | 7/2001 | Skopp et al. | |
| 6,275,825 B1 | 8/2001 | Kobayashi et al. | |
| 6,412,003 B1 | 6/2002 | Melen | |
| 6,449,651 B1 | 9/2002 | Dorfman et al. | |
| 6,510,523 B1 | 1/2003 | Perlman et al. | |
| 6,529,952 B1 | 3/2003 | Blumenau | |
| 6,539,481 B1 | 3/2003 | Takahashi et al. | |
| 6,584,505 B1 | 6/2003 | Howard et al. | |

(Continued)

FOREIGN PATENT DOCUMENTS

JP 09006682 A 1/1997

OTHER PUBLICATIONS

WeyBackMachine: AOL™., Retrieved on Feb. 27, 2007 from <http://web.archive.org/web/19971211100358/http://www.aol.com/> and <http://web.archive.org/web/19991111024749/http://www.aol.com/index.html>, 2 pages.*

*Primary Examiner* — Peling Shaw

(74) *Attorney, Agent, or Firm* — Cantor Colburn LLP

(57) ABSTRACT

Methods relate to providing limited temporary access to a web site to visitors who desire to experience all the features provided by this site before becoming a member. The temporary access privileges may be limited by duration, which is counted from the initial access request, or by number of accesses. At the end of the temporary access period, the visitor may be given additional access privileges before being permanently denied access. The user may be identified either by the IP address assigned to the user device or by the user's e-mail address.

19 Claims, 4 Drawing Sheets

U.S. PATENT DOCUMENTS

| | | |
|---|---|---|
| 6,606,659 B1 | 8/2003 | Hegli et al. |
| 6,654,745 B2 | 11/2003 | Feldman |
| 6,662,230 B1 | 12/2003 | Eichstaedt et al. |
| 6,678,731 B1 | 1/2004 | Howard et al. |
| 6,704,787 B1 | 3/2004 | Umbreit |
| 2001/0034635 A1 | 10/2001 | Winters |
| 2002/0013768 A1 | 1/2002 | Ganesan |
| 2004/0015586 A1 | 1/2004 | Hegli et al. |

\* cited by examiner

SYSTEMS AND METHODS FOR LIMITING WEB SITE ACCESS

CROSS-REFERENCE TO RELATED APPLICATIONS

This application is a continuation of U.S. patent application Ser. No. 09/873,712 filed Jun. 4, 2001, now U.S. Pat. No. 6,968,385 the contents of which are incorporated by reference herein in their entirety, which is a continuation of U.S. patent application Ser. No. 09/747,005 filed Dec. 22, 2000, now abandoned the contents of which are incorporated by reference herein in their entirety.

FIELD OF THE INVENTION

The present invention relates to systems and methods for access control, and more particularly for limiting web sites access.

BACKGROUND OF THE INVENTION

The advent of computers and the Internet has changed profoundly the way that information and services are provided. Now consumers can have instantaneous access to information with a click of a mouse and can make a purchase without leaving their house. For example, a consumer can read the latest news from a newspaper's web site or check his stock portfolio at a web site of a financial institution. The number of people accessing the information and obtaining services through the Internet is increasing daily, and this represents a new market for all merchants of information and services.

This new electronic market represents a new opportunity and a new challenge to all merchants. Now the merchants can reach consumers who they would not have been able to reach, but at the same time new business models need to be developed to overcome new obstacles associated with the new opportunity. One of the obstacles is to overcome consumer's reluctance to adopt the new technology and to use the new electronic market. Traditionally, consumers have the opportunity to check a product or to ask salespersons questions before purchasing a product or service. Computers and the Internet do not readily provide this opportunity. The consumers have to rely mainly on the service or product description and the merchant's trustworthiness when purchasing the service or product. If the service or product description is accurate and matches the consumer's expectation, the consumer will most likely be satisfied with the purchase. If the description is not accurate or the product fails to meet the consumer's expectation, the consumer will be at the mercy of the merchant when the consumer tries to obtain a refund.

One example of consumers needing to take a risk is many sites require consumers to pay a subscription fee to access the sites. Consumers may not really know what information or services are available until the consumers pay the fee. Many consumers do not want to pay any fee until they see exactly what comes with a subscription. To provide consumer with more knowledge, many sites offer access to a guest's portion of the site, which has a subset of all information or services available through a full subscription. While this additional insight is helpful, consumers are typically still faced with not knowing the entire range of services or information available with full membership.

Some free service providers grant temporary full access to their web sites, and the full access granted is generally limited to a short duration. These sites generally require users to provide some personal information to become members, but the membership is free. A membership has a short duration, and the users' login information and access privilege are removed after a short time period. A user can gain unlimited access by providing different identification information. The approach adopted by these web sites is to force the users to register, and they are not concerned in distinguishing between information or services offered to guests versus what is offered to paying members.

SUMMARY OF THE INVENTION

The present invention addresses the problems above by providing systems and methods for presenting previews to consumers so that they become paying members of a paid access web site. The invention accomplishes this by providing free full access, but limited in duration, to information or services. For instance, merchants can provide a full-feature based access to their products and services before consumers place a purchase order. The full-feature access allows consumers to get the actual experience of using a product or a service. For example, in a web site provided by a financial institution, a user cannot only check the instantaneous stock prices, which are often provided by all competing financial institutions, but also access the stock analysis for a particular stock provided by that particular financial institution. This access introduces the consumers to different services and features provided by that financial institution and entices the consumers to become a playing member.

The access can be restricted in a number of ways, such as to a certain period or a certain number of service requests. When the access is limited to a time period, the system according to the present invention sets a timer when a user is given access privilege for the first time. When the timer for that user expires, the access privilege for the user is revoked. When the access is limited to a certain number of accesses, the system records every single service request from the user, and when the number of service requests has reached a predefined limit, the access privilege for the user is then revoked.

The system according to the preferred embodiment of the present invention has a web server associated with a web site on the Internet. The web server handles all accesses and service requests for the web site and has a control program, a password generator, a timer, an e-mail server, and a database. The control program creates an entry in the database for each temporary user who is identified either by the Internet Protocol (IP) address or by the temporary user's e-mail address. The web server also records other information such as the number of accesses, the time stamp of the first access, the number of service requests (the number of clicks), the user's IP address, and the user's e-mail address. A password is generated for each user, and the password is sent to the user via the user's e-mail address. A timer is started for each temporary user to track the user's access time.

A user obtains the temporary access privilege by visiting the web site and requesting a temporary login. The web site identifies the user through either the IP address embedded in the request message or the e-mail address provided by the user. The web server creates an entry in the database for the user and generates a temporary user identification and password. The web server stores time stamp of this initial request in the entry for this user, or the web server starts a timer associated with this user's entry.

During subsequent visits to the web site, the web server validates the user by his IP address and his password. The web server can also validate the user by his e-mail and his password. The web server checks the database to ensure that the user's temporary privilege to access the web site has not expired, and this check is done by checking the time stamp against the current time or the number of service requests against a predefined limit. If the temporary access privilege is limited to a number of service requests, then an access counter increments for every subsequent service request. Each time the user requests a file, an article, a calculation, or other information or services the access counter is incremented. If the access privilege is limited to a particular time limitation, then the web server checks the time stamp before providing any service or information to the user. If the time has expired, the web server will not honor the user's request.

When the temporary access privilege has expired by either exceeding the number of service requests or time allotments, the user's entry is marked and the future registration or access will be denied.

DESCRIPTION OF THE DRAWINGS

The foregoing and other objects, aspects and advantages will be better understood from the following detailed description of a preferred embodiment of the invention with reference to the drawings, in which:

FIG. 5 is a flow chart for granting a temporary log in.

DETAILED DESCRIPTION OF THE INVENTION

Figure 1:
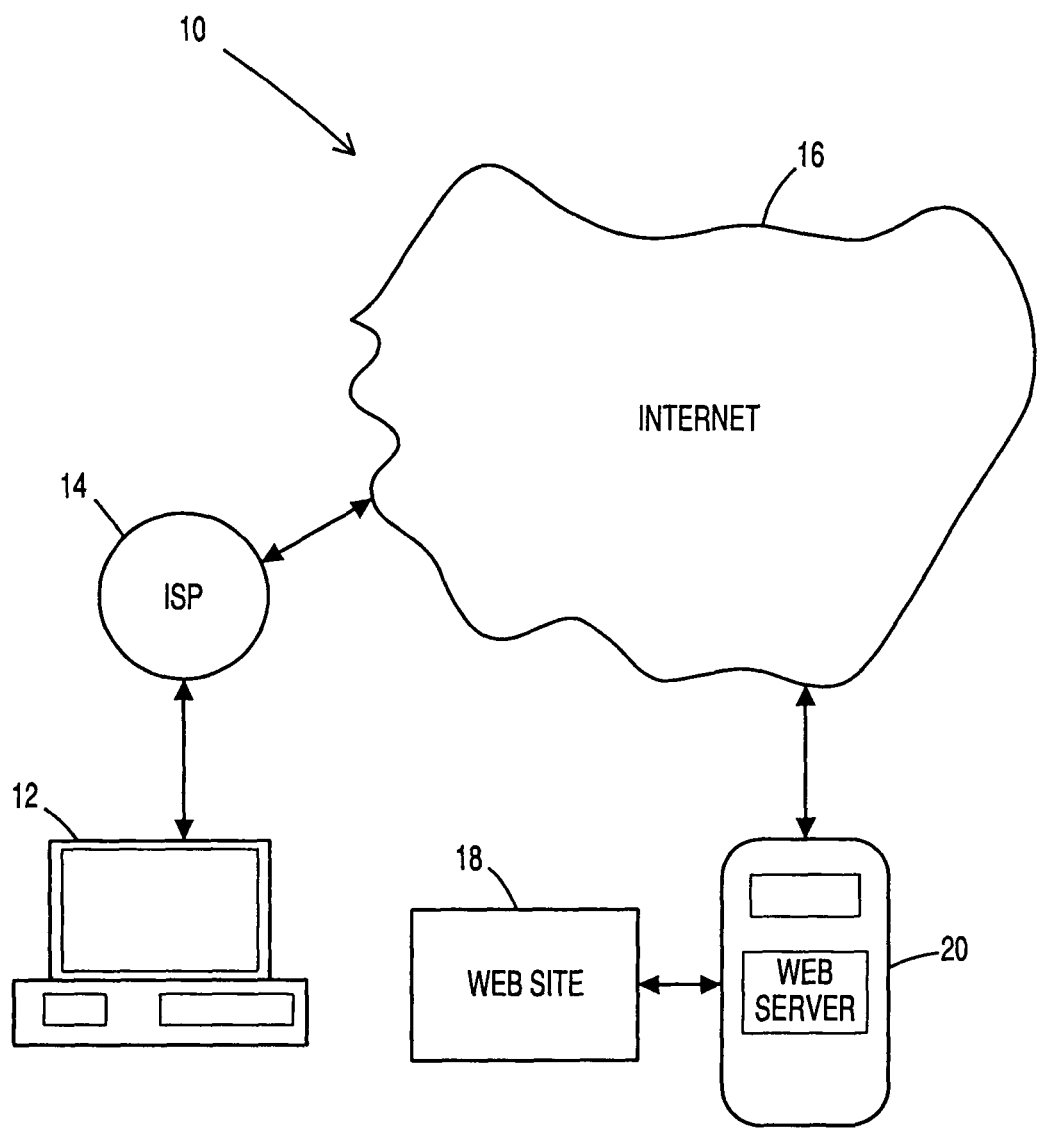
FIG. 1 is a schematic high level architectural diagram of a preferred embodiment of a system according to the present invention.

Referring now in greater detail to the drawings, in which like numerals represent like components throughout the several views, FIG. 1 is a schematic high-level architectural diagram of a system 10 according to a preferred embodiment of the present invention. An end user device 12 is connected to an Internet Service Provider (ISP), 14, such as through a dial-up connection or a local area network (LAN) connection. The ISP 14 is in turn connected to the Internet 16. A user at the end user device 12 can access a web site 18 of a service provider, and the web server 20 hosts the web site 18. The web site 18 can belong to a newspaper, a magazine, or a bank, and different information or other services can be provided by the web site 18. If a newspaper publisher owns the web site 18, the newspaper's web site 18 can offer an on-line version of the newspaper that would be updated as the news happens. If a bank or other financial institution owns the web site 18, the bank's web site 18 can offer an up-to-the-minute evaluation of a user's stock portfolio.

Web sites can provide services or products, and for the purposes of this specification, the web sites are referred to as places to obtain services. In this specification, service providers, goods providers, and merchants are commonly referred as merchants.

A common scenario for a user to access the system 10, which is implemented according to the present invention, is as follows. The user at the user device 12 wants to accesses the web site 18 through the Internet 16. The user requests a temporary login at the web site 18, if he does not have one already. The web server 20 that hosts the web site 18 accesses a database 28 shown in FIG. 2 to determine whether the user has already been granted temporary access. If the web server 20 determines the user can have temporary access to the web site 18, the user can then have full access to the web site 18.

The user can access the web site 18 in different ways. He can access the web site 18 by using his computer as the user device 12 and dialing into an ISP 14 to access the Internet 16. The user's computer can also be connected to a local area network (LAN) and then there is no need for dialing into an ISP 14. The user can also use a web enabled radiotelephone, a personal digital assistance (PDA), a pocket personal computer (PC), an interactive television, or other wireless communication or data devices.

Depending on the user device 12 used, the user accesses the web site 18 through different medium and/or networks. If the user uses a wireless device, such as a wireless telephone or a wireless PDA, then the user's request goes through radio transmissions to a mobile switching center (MSC) and to an ISP 14, before being connected to the Internet 16. If the user uses an interactive television, then the user's request goes through a cable television provider to connect to the Internet 16.

Generally the web site 18, which can best utilizes the present invention, provides some services, information, or goods to its subscribers, and this web site 18 generally limits the access to its subscribers. The merchants, such as newspaper publisher or financial institution, can offer special services to their subscribers at their web site 18. The merchants assign each subscriber a user identification code and an access code. A web server 20 hosts the web site 18 and stores the information about the subscribers in a database. When a subscriber wants to access the web site 18, the subscriber provides his user identification code and access code. The server 20 grants the access after validating the user identification and access codes.

Figures 2, 3:
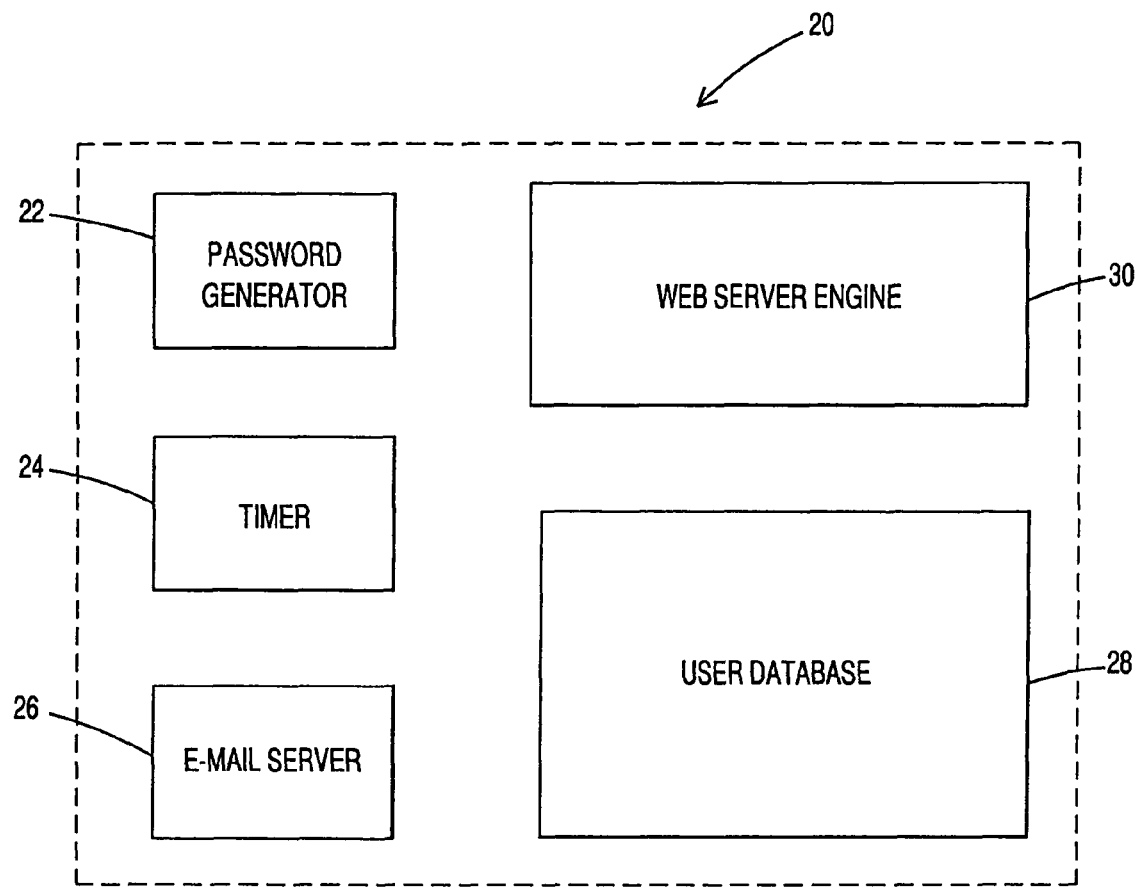
FIG. 2 is a schematic block diagram of a web server shown in FIG. 1.
FIG. 3 is a illustration of an database entry in the database of FIG. 2.

When a non-subscriber (visitor) want to access the web site 18 and experience the special services before deciding whether or not to become a paying member, he may obtain a temporary login provided by the web server 20. To support this temporary login procedure, the web server 20 is equipped, according to a preferred embodiment of the present invention shown in FIG. 2, with a password generator 22, a timer facility 24, an e-mail server 26, a database 28, and a web server engine 30. The web server engine 30 is generally a HTTP (Hyper Text Transfer Protocol) server and supports communication with a user end device 12 that is a HTTP client. The communication between the web server 20 and the user end device 12 is through HTTP messages generally written in Hyper Text Markup Languages (HTML). Alternately, the HTTP messages can also be written in extensible Markup Language (XML) or in other languages as discussed below. When a visitor requests a temporary access privilege, the web server engine 30 identifies the visitor through the visitor's Internet Protocol (IP) address embedded in the HTTP messages and assigns a user identification code to the visitor. The password generator 22 creates a password for the user identification code. An entry 40, such as the one shown in FIG. 3, is created in a temporary visitor table in the database 28 for the visitor. The user identification code and the password assigned to the visitor are stored in the temporary visitor table. The timer facility 24 starts a timer and associates the timer to the user identification code.

The entry 40 contains user information stored in different fields. In the preferred embodiment, the entry 40 has the following fields: user identification 42, number of accesses 44, time stamp 46, number of clicks/requests 48, IP address 50, and e-mail address 52. Number of accesses 44, time stamp 46, number of clicks/requests 48, or other measure of the visitor's use of services are collectively called access records.

The user identification 42 must be unique and is either chosen by the visitor or assigned by the server 20. The server 20 needs to ensure the uniqueness of user identification 42 assigned. Therefore, before assigning the user identification 42 to the visitor, the web server engine 30 needs to check the database 28 for conflicts.

The number of accesses 44 records the total number of temporary access privileges granted to the visitor. The merchant may set a policy that permits a visitor to obtain, for example, a total of three temporary logins and each temporary login may be limited for a specific duration. At the end of each temporary login period, the web server engine 30 increments the number of accesses 44 and denies the free access if the number of accesses 44 exceeds three, for example.

The time stamp 46 is a mechanism that measures the duration of each temporary access privilege. When the web server 22 grants a temporary access privilege to a visitor, the web server engine 30 creates a time stamp 46. When the visitor attempts to access the web site 18, the web server engine 30 checks to see whether or not the temporary login is still valid. If the temporary access is valid for two days and the visitor is trying to access the web site 18 on the fourth day since the access was granted, the web server engine 30 denies the login attempt. If the temporary access is valid for 60 minutes and the visitor is trying to access the web site 18 more than one hour after he was granted the access, the web server engine 30 denies the login attempt.

For some applications of the invention and as transmission bandwidth becomes more available, it may be desirable to measure time in terms of minutes, not just days. For example, a visitor may wish to see the first 5 minutes of a movie before deciding whether to place an order for the full movie. The first five minutes of the movie is delivered to the visitor via streaming media. If the visitor enjoys the first five minutes, then the entire movie is delivered via the same media.

The duration of a temporary access privilege can also be measured by the total cumulative time that a visitor has accessed the web site. The length of each visit from the time the visitor logs into the web site until the visitor logs out is recorded, and the access request is denied when the total cumulative time exceeds a preset limit.

The number of clicks/requests 48 is another mechanism to control the temporary access privileges. Number of clicks/requests 48 records each "mouse click" that the visitor makes while attempting to download information from the web site 18. Generally each "click" is associated with a page request, therefore, number of clicks 48 is also known as number of accesses. In a web site 18 that provides current news, the merchant may want to limit the free trial access to a certain number of news requests. For example, the merchant may limit the free access to five pieces of the latest news, and his free access privilege is terminated once the visitor has read five news articles. The visitor needs to subscribe as a full member if he wants to get more news articles from web site 18.

The IP address 50 identifies the visitor. The IP address 50 is the IP address assigned to the visitor's user device 12, and the IP address 50 is obtained from HTTP messages sent by the visitor's user device 12 to the web site 18. Generally, the IP address assigned to each user device 12 is not changed unless the user device 12 is reconfigured in the network. However, if the user device 12 is not permanently attached to a network, which commonly occurs with home personal computers, the user device 12 is not assigned to a permanent IP address. For example, a consumer who accesses the Internet through an ISP often has no permanent IP address assigned to his user device 12. Instead, the consumer's user device 12 will be assigned to a different IP address each time he dials into the ISP.

In the above situation, the best way to identify a visitor is through his e-mail address. The visitor can also be identified by his e-mail address, and the e-mail address can also be used as a substitute user identification code. In this situation, the password created could be e-mailed to the visitor's e-mail address as a way to confirm the e-mail address provided by the visitor.

In an alternate embodiment, the web server engine 30 may limit a visitor's temporary access based on other factors such as the size of files downloaded. In this embodiment, the data entry 40 will store information about the size of files downloaded by a temporary visitor in a "size" field. Each time the visitor downloads a file, the file size is added to the "size" field. The visitor's access will be denied, when the "size" value exceeds a preset limit.

In accordance with the preferred embodiment, the database 28 has two other tables: regular registered user table and an expired temporary visitor table. The regular registered user table contains the list of subscribers who have full access to the controlled access web site. The expired temporary visitor table has the IP address or e-mail address of visitors who have used-up all the free access privileges and are disqualified for any additional free access privileges.

Figure 4:
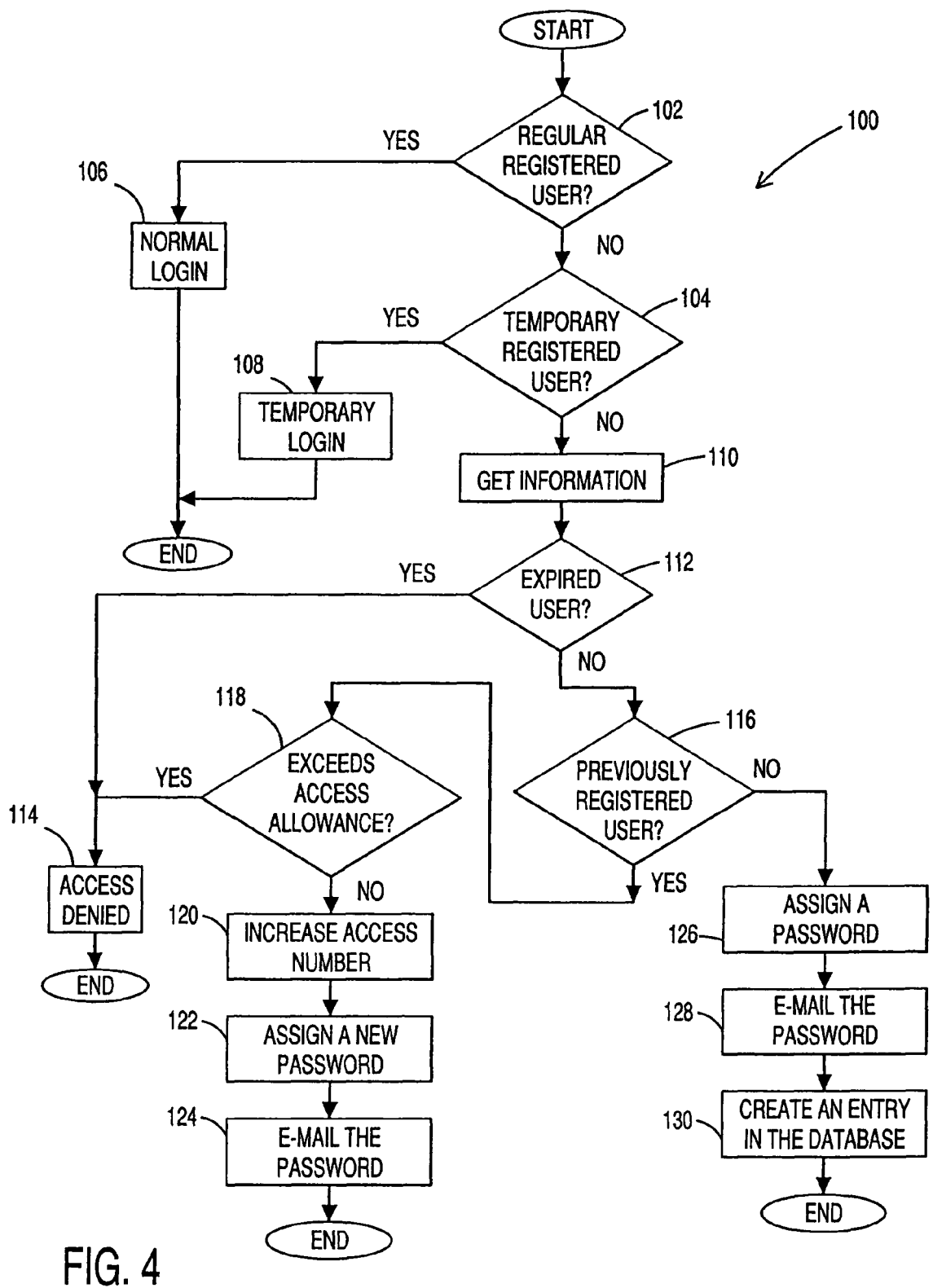
FIG. 4 is a flow chart by which that system of FIG. 1 operates.

FIG. 4 is a flow chart for user access 100. When a user visits a controlled access web site, the web server engine 30 checks whether the user is a regular registered user at 102, or a temporary registered user at 104. If the user is a regular registered user, which means the user is a subscriber, the user proceeds with the normal login procedure at 106. If the user is a temporary registered user, which means that a temporary access privilege was granted to the user, the user proceeds with the temporary login procedure at 108. The normal login procedure comprises checking in the validity of the user's identification and access codes. The normal login procedure is well known to those skilled in the art and will not be further detailed in this specification.

If the user is neither a regular registered user nor a temporary registered user, the web server engine 30 obtains the user information, such as the user's IP address 50 or e-mail address 52, from the user's IP messages or by asking the user at 110. The web server engine 30 checks the user's IP address or e-mail address against the entries of the expired temporary visitor table at 112, and if the user is an expired temporary visitor who has used-up all free access privileges, then the web server engine 30 denies the access at 114.

If the user is not an expired temporary visitor, the user may be entitled to temporary access privileges. The web server engine 30 checks the user information against the temporary visitor table to learn whether the user is a previously registered visitor at 116. If the user has previously registered as a visitor, the web server engine 30 retrieves the entry 40 corresponding to the user from the temporary visitor table and analyzed. If the number of accesses 44 has exceeded the access allowance number preset by the merchant at 118, the web server engine 30 denies the access at 114 and adds the user information to the expired temporary visitor table. If the number of accesses 44 has not exceeded the access allowance number, the web server engine 30 increments the number of accesses 44 at 120. The password generator 22 generates a new password at 122, and the e-mail server 26 sends the new password to the user's e-mail address at 124. Alternatively, the user can set the password and consequently there is no need to e-mail the password. The user can also choose to have a new user identification code assigned to him, and this user identification code will then be used for login purposes.

If the user has not been granted access to the web site before, the web server engine 30 creates a new user identification code and password and assigns them to the user at 126. As described above, the web server engine 30 can identify the user by his e-mail address and let the user to choose his own password. If a password is generated for the new user, it can be provided immediately to the user or sent via the user's e-mail address at 128. The web server engine 30 stores the user information, such as the user identification code, the password and the IP address in a new entry 40 in the database 28 at 130. If the timer is used, then the timer facility 24 creates a new timer for the user. The user will have full access to the web site in his future visits until the timer has expired. If the web server engine 30 controls the access through the number of accesses or clicks, then the user will have full access while he has not used-up all of the requests.

Figure 5:
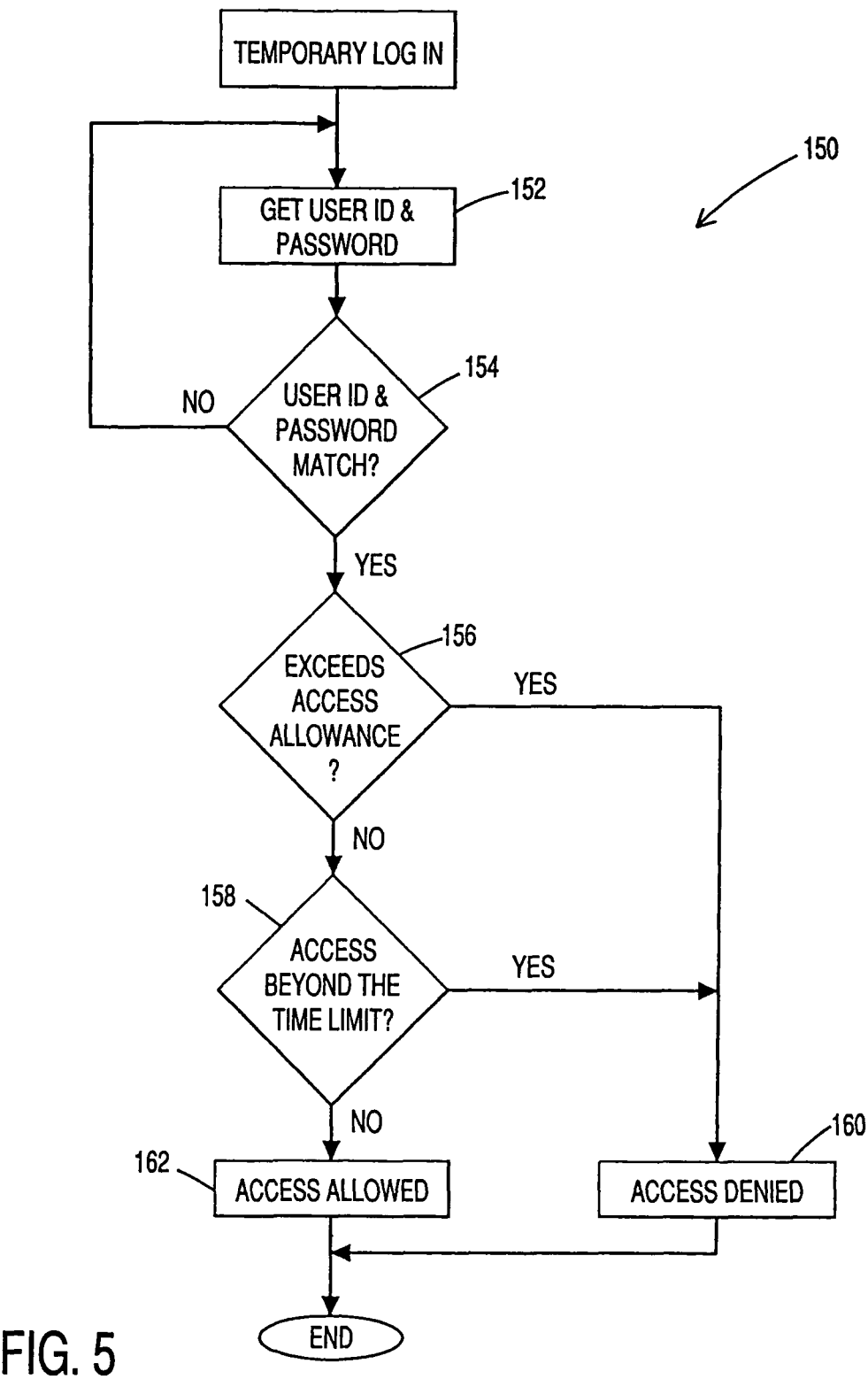

After the user signed-up for the temporary access privilege, the user can access the controlled access web site through the temporary login procedure, 150, shown in FIG. 5. The user supplies his identification code and password at 152. They are checked by the web server engine 30 at 154. If the web server engine 30 does not validate the user identification code and password, the web server engine 30 allows the user to input them again. If the web server engine 30 validates the user as a registered temporary visitor, it will then check whether the user has exceeded his access privilege at 156. The user exceeds his access privilege if the timer associated with the data entry containing the data has expired at 158 or if the number of clicks 48 exceeds the preset allowance. If the user's access privilege has been exceeded, the web server engine 30 denies his access at 160. If the user's access privilege has not been exceeded, then the web server engine 30 allows the access at 162.

In an alternate embodiment, the present invention can be implemented through use of "cookies." Cookie is a mechanism commonly used in HTTP protocol implementation to store HTTP client information on the HTTP client site. A cookie is usually an encrypted text string containing user information that helps a HTTP server to identify a returning user. In the context of the present invention, the user information that the web server engine 30 stores in an entry 40 in the database 28 can be stored in the format of a cookie in the user's device 12. With this approach the web server engine 30 behaves as non-state machine, i.e., the web server engine 30 need not remember the user nor when the user last accessed the web server 20. The web server engine 30 retrieves the cookie from the user's machine after receiving the request. However, the web server engine 30 may choose to save some user information against the possibility of loss cookies.

In yet another alternate embodiment, the user device 12 is a handheld communication device, such as a cellular telephone or a PDA, capable of communicating through wireless application protocol (WAP) with a WAP server. The WAP server communicates with the handheld device through web pages written in Handheld Device Markup Language (HDML). These web pages are specially written for display in small screens. The handheld communication device communicates through radio frequency transmission with a communication tower and a base station, which ultimately routes the handheld communication device's access request to a WAP server. The WAP server can be described as a visual interactive computer telephone voice response system that provides services to wireless telephone users.

The WAP server provides temporary logins to non-subscribers just like web servers 20. The WAP server identifies visitors through telephone numbers assigned to each user device or through mobile identification number (MIN). The WAP server can provide information on stocks, weather, news, etc., and the visitor can experiment these features before deciding whether to become a paying member. The process for granting a temporary login and for allowing access is similar to those described in FIGS. 4 and 5, except there is no need to generate and to mail a password to the visitor.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A control system for providing visitors temporary access through a network to a controlled access web site, the control system comprising:
   an access control to obtain visitor information and determine if a visitor is a registered user or a temporary user, the access control mechanism providing full access to the registered user and providing temporary access information based on visitor information for the temporary user;
   a database having a plurality of entries, each entry is an access record assigned to one visitor which contains the temporary access information; and
   a server control engine to receive temporary access requests from the visitor to analyze the temporary access information stored in the database, and for granting temporary access permissions if the visitor has not exceeded an access limit;
   wherein the access control mechanism determines if the visitor is a previously registered temporary user, if the visitor is the previously registered temporary user the access control mechanism determining if the previously registered temporary user has exceeded an access limit; if the previously registered temporary user has not exceeded access limits, the access control mechanism increasing access limits for the visitor.

2. The control system of claim 1, wherein the access record further comprises a time stamp.

3. The control system of claim 1, wherein the access record further comprises a number of requests.

4. The access control system of claim 3, wherein the server control engine:
   reads the number of requests; and
   checks the number of requests against the access limit.

5. The control system of claim 1, wherein the access record further comprises a number of accesses.

6. The control system of claim 5, wherein the server control engine:
   reads the number of accesses and
   checks the number of accesses against the access limit.

7. The control system of claim 1, wherein the access record further comprises a user identification code.

8. The control system of claim 1 wherein the access control mechanism comprises a timer facility for measuring an amount of visitor temporary access.

9. The control system of claim 8, wherein the server control engine associates a new timer for each new visitor.

10. A computer program product, tangibly embodied on a computer readable medium, for controlling accesses to a controlled access site, the computer program product including instructions that, when executed by a computer, cause the computer to perform operations comprising:
  receiving a request from a visitor to access the site;
  if the visitor is a registered user providing full access to the site;
  if the visitor is a temporary user:
    identifying the visitor;
    creating an access record for the visitor which identifies the visitor and an amount the visitor has accessed the site;
    checking the amount stored in the access record against a preset access limit; and
    granting access to the visitor if the amount stored in access record does not exceed the preset access limit;
  if the visitor is a previously registered temporary user:
    determining if the previously registered temporary user has exceeded an access limit,
    if the previously registered temporary user has not exceeded access limits, increasing access limits for the visitor.

11. A method for providing temporary access to a web site, the method comprising:
  receiving a request from a visitor seeking access to the web site;
  identifying the visitor;
  if the visitor is a registered user providing full access to the site;
  if the visitor is a temporary user:
    creating an access record for the visitor reflecting an amount the visitor has accessed the web site;
    setting an access allowance limit for the visitor;
    checking the amount stored in the access record against the access allowance limit; and
    permitting access to the web site until the amount in the access record equals the access allowance limit;
  if the visitor is a previously registered temporary user, determining if the previously registered temporary user has exceeded an access limit,
    if the previously registered temporary user has not exceeded access limits, increasing access limits for the visitor.

12. The method for providing temporary access of claim 11, wherein identifying the visitor further comprises:
  obtaining an Internet Protocol address from the visitor; and
  generating an access code for the visitor.

13. The method for providing temporary access of claim 11, wherein creating the access record further comprises setting a request counter.

14. The method for providing temporary access of claim 13 wherein creating the access record further comprises incrementing the request counter for each request from the visitor.

15. The method for providing temporary access of claim 11, wherein creating the access record further comprises setting a number of accesses.

16. The method of providing temporary access of claim 15, wherein the access record has an access counter and the method further comprises incrementing the access counter for each login from the visitor.

17. The method for providing temporary access of claim 11, wherein creating the access record further comprises setting a time stamp.

18. The method for providing temporary access of claim 17 wherein checking the access record further comprises checking a current time against the time stamp each time the visitor accesses the web site.

19. The method for providing temporary access of claim 11, wherein checking the access record further comprises:
  obtaining a cookie from a visitor device, the cookie including visitor information; and
  checking visitor information against the access allowance limit of the visitor, wherein visitor information on the cookie comprises:
  a visitor identification code;
  a visitor access allowance limit for the visitor; and
  a visitor amount the visitor has accessed the web site.

* * * * *